United States Patent
Matsumoto

(10) Patent No.: US 11,095,778 B2
(45) Date of Patent: Aug. 17, 2021

(54) STORING AND OUTPUTTING LOG FOR FAILURE ANALYSIS IN IMAGE FORMING APPARATUS EQUIPPED WITH SATA SYSTEM, CONTROL METHOD THEREFOR, AND STORAGE MEDIUM

(71) Applicant: CANON KABUSHIKI KAISHA, Tokyo (JP)

(72) Inventor: Akihiro Matsumoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/882,985

(22) Filed: May 26, 2020

(65) Prior Publication Data

US 2020/0382655 A1  Dec. 3, 2020

(30) Foreign Application Priority Data

May 31, 2019 (JP) .............................. JP2019-102980

(51) Int. Cl.
*H04N 1/00* (2006.01)

(52) U.S. Cl.
CPC ....... *H04N 1/00074* (2013.01); *H04N 1/0009* (2013.01); *H04N 1/00029* (2013.01); *H04N 1/00039* (2013.01)

(58) Field of Classification Search
None
See application file for complete search history.

(56) References Cited

U.S. PATENT DOCUMENTS

| | | | |
|---|---|---|---|
| 2006/0291871 A1* | 12/2006 | Yamaguchi | H04N 1/00061 399/8 |
| 2012/0062938 A1* | 3/2012 | Tajima | G06F 3/1204 358/1.15 |
| 2013/0208301 A1* | 8/2013 | Taniguchi | G06F 3/1236 358/1.14 |
| 2018/0293407 A1* | 10/2018 | Wu | H04L 9/3226 |

FOREIGN PATENT DOCUMENTS

JP          2017199180 A     11/2017

* cited by examiner

*Primary Examiner* — Andrew H Lam
(74) *Attorney, Agent, or Firm* — Rossi, Kimms & McDowell LLP

(57) ABSTRACT

An image forming apparatus which is capable of analyzing a failure of an IC that has a high degree of independence and in which no recording area can be added to an internal memory. The image forming apparatus has a controller equipped with a storage device. Execution results of a plurality of event processes for events relating to the controller are recorded in the storage device. What is recorded in the storage device is output from the controller. A scope of what is recorded in the storage device is specified.

10 Claims, 10 Drawing Sheets

FIG. 4A

| MODE SETTING | SETTING EXAMPLE | INITIAL VALUE |
|---|---|---|
| OUTPUT OFF | 00 | 00 |
| MODE 1 | 01 | |
| MODE 2 | 10 | |
| — | 11 | |
| MODE 2 SETTING | SETTING EXAMPLE | INITIAL VALUE |
| NUMBER OF TIMES THAT NORMAL LOG IS OBTAINED | 5 | 2 |
| ABNORMAL LOG OBTAINMENT STARTING POINT | 100 | 0 |
| FORCED OUTPUT | 1 | 0 |

FIG. 4B

| TERMINAL 1/2 SETTING | DETAIL | TERMINAL 3/4 SETTING | DETAIL |
|---|---|---|---|
| 00 | OUTPUT OFF | — | — |
| 01 | MODE 1 | — | — |
| 10 | MODE 2 | 00 | FIXED (INITIAL VALUE) |
| | | 01 | VARIABLE (CONTINUED) |
| | | 10 | — |
| | | 11 | FORCED OUTPUT |
| 11 | — | — | — |

STORING AND OUTPUTTING LOG FOR FAILURE ANALYSIS IN IMAGE FORMING APPARATUS EQUIPPED WITH SATA SYSTEM, CONTROL METHOD THEREFOR, AND STORAGE MEDIUM

BACKGROUND OF THE INVENTION

Field of the Invention

The present invention relates to an image forming apparatus, a control method therefor, and a storage medium.

Description of the Related Art

For an image forming apparatus, it is necessary to quickly analyze the cause of a failure occurring in a commercial mass production stage at a factory or a failure occurring in the market and then quickly correct the failure. In general, failures of the image forming apparatus have reproducibility although their periodicity varies. A variety of debugging methods using the reproducibility are adopted to analyze a failure of the image forming apparatus. For example, there is a first debugging method according to which all of processing steps are recorded in a storage device of the image forming apparatus that has shifted into an analysis mode, and the recorded information is analyzed. There is also a second debugging method according to which a debugger that externally emulates a CPU of the image forming apparatus is attached to the image forming apparatus and executes programs step by step to analyze a failure (see, for example, Japanese Laid-Open Patent Publication (Kokai) No. 2017-199180).

A SATA (Serial Advanced Technology Attachment) system in which a bridge IC is connected between an HDD, and a SATA host control unit which controls reading and writing of data from and into the HDD, is under development. To analyze a failure of an image forming apparatus equipped with the SATA system, information on execution results of processes using the SATA system is required.

However, there may be a case where in the image forming apparatus equipped with the SATA system, a failure cannot be analyzed because information on execution results of processes using the SATA system is not obtained. For example, if a bridge IC conforms to a predetermined certification standard such as IPS 140 (Federal Information Processing Standardization 140), this bridge IC has a very high degree of independence as a chip. This bridge IC is equipped only with a SATA I/F that is required to configure the SATA system, and hence it is impossible to perform control for analyzing an internal state of the bridge IC from outside. Therefore, the second debugging method that emulates from outside the image forming apparatus cannot be applied. Moreover, in this bridge IC, information is processed using only an internal memory installed in the bridge IC, and no recording area can be added to the internal memory. For this reason, if the first debugging method is used, only some of execution results of processes carried out by the bridge IC can be recorded in the internal memory, making it impossible to correctly analyze a failure. Namely, the image forming apparatus according to the prior art has a problem because it cannot analyze a failure of an IC which has a high degree of independence and in which a recording area cannot be added to an internal memory.

SUMMARY OF THE INVENTION

The present invention provides an image forming apparatus that are capable of analyzing a failure of an IC that has a high degree of independence and in which no recording area cannot be added to an internal memory, a control method therefor, and a storage medium.

Accordingly, the present invention provides an image forming apparatus that has a controller equipped with a storage device, comprising a memory storing a program, and at least one processor executing the program to perform control to record execution results of a plurality of event processes for events relating to the controller, perform control to output what is recorded in the storage device from the controller, and specify a scope of what is recorded in the storage device.

According to the present invention, a failure of an IC which has a high degree of independence and in which no recording area can be added to an internal memory can be analyzed.

Further features of the present invention will become apparent from the following description of exemplary embodiments (with reference to the attached drawings).

BRIEF DESCRIPTION OF THE DRAWINGS

FIGS. 4A and 4B are views useful in explaining settings as to serial output of logs for use in analyzing a failure of the MFP in FIG. 1.

DESCRIPTION OF THE EMBODIMENTS

An embodiment of the present invention will now be described in detail with reference to the drawings. It should be noted that in the following description of the present embodiment, the present invention is applied to an MFP which is an image forming apparatus, but the present invention is not limited to the MFP. For example, the present invention may be applied to other apparatuses such as a smartphone, a tablet terminal, and a PC equipped with an IC which has a high degree of independence and to which a writable area cannot be added.

Figure 1:
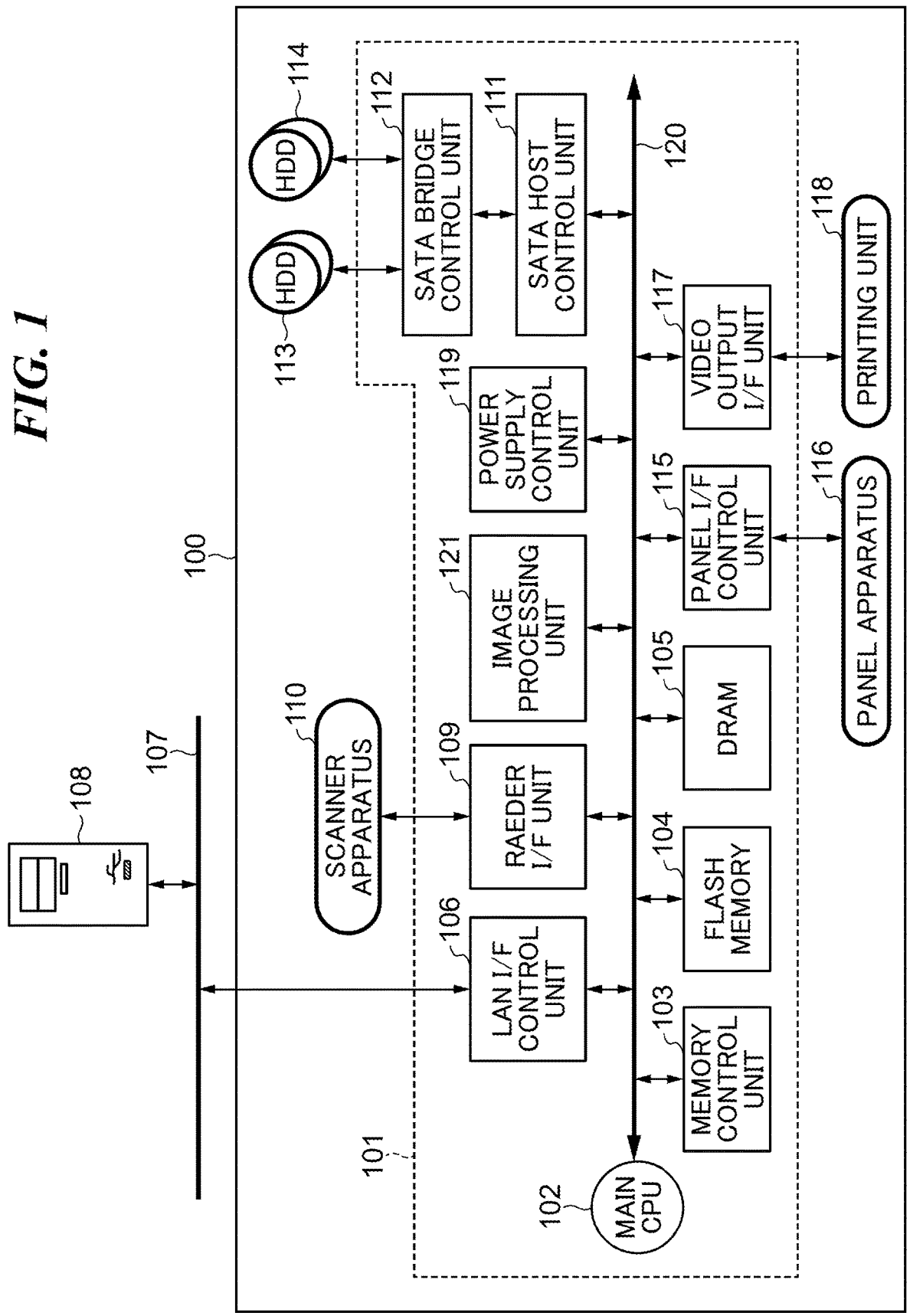
FIG. 1 is a diagram schematically showing an arrangement of an MFP which is an image forming apparatus according to an embodiment of the present invention.

FIG. 1 is a diagram schematically showing an arrangement of an MFP 100 which is an image forming apparatus according to an embodiment of the present invention. Referring to FIG. 1, the MFP 100 has a main controller board 101, a scanner apparatus 110, a panel apparatus 116, a printing unit 118, an HDD 113, and an HDD 114. The main controller board 101 is connected to the scanner apparatus 110, the panel apparatus 116, the printing unit 118, the HDD 113, and the HDD 114. The main controller board 101 has a main CPU 102, a memory control unit 103, a flash memory 104, a DRAM 105, a LAN I/F control unit 106, a reader I/F unit 109, an image processing unit 121, a panel I/F control unit 115, a video output I/F unit 117, a power supply control unit 119, a SATA host control unit 111, and a SATA bridge control unit 112. It should be noted that DRAM is an abbreviation for "dynamic random access memory". The main CPU 102, the memory control unit 103, the flash memory 104, the DRAM 105, the LAN I/F control unit 106, the reader I/F unit 109, the image processing unit 121, the panel I/F control unit 115, the video output I/F unit 117, the power supply control unit 119, and the SATA host control unit 111 are connected to one another via a main bus 120. The SATA bridge control unit 112 is connected to the SATA host control unit 111.

The main CPU 102 controls a system of the MFP 100 and performs computations. The memory control unit 103 controls input and output of data to and from various storage devices and controls DMA (Direct Memory Access) to the storage devices. The flash memory 104 is a nonvolatile rewritable storage device. The flash memory 104 stores a control program for the entire system of the MFP 100, control parameters, and so forth. The DRAM 105 is a volatile rewritable storage device typified by DDR (Double Data Rate) memory. The DRAM 105 is used as a work area for the main CPU 102, a storage area for print data, a storage area for various types of data, and so forth. The LAN I/F control unit 106 controls data communications with external apparatuses such as a host computer 108. For example, the LAN I/F control unit 106 obtains image data from the host computer 108. The LAN I/F control unit 106 supports TCP/IP (Transmission Control Protocol/Internet Protocol).

The reader I/F unit 109 controls communications between the main controller board 101 and the scanner apparatus 110. For example, the reader I/F unit 109 obtains image data, which has been scanned off by the scanner apparatus 110, from the scanner apparatus 110. The MFP 100 implements a copying function by printing the image data scanned off by the scanner apparatus 110. The image processing unit 121 performs image processing on image data obtained from the LAN I/F control unit 106 and the reader I/F unit 109. The SATA host control unit 111 controls communications with devices compliant with predetermined standards which define specifications of security requirements for encryption modules, for example, the SATA standard. The SATA bridge control unit 112 complies with the SATA standard and has a data encryption/decryption function and a RAID (Redundant Arrays of Inexpensive Disks) control function. The SATA host control unit 111 is connected to an upstream side of the SATA bridge control unit 112. A plurality of host I/Fs (not shown) is provided on a downstream side of the SATA bridge control unit 112, and the HDD 113 and the HDD 114 are connected to each of those host I/Fs. The HDD 113 and the HDD 114 may be another type of storage devices, for example, SSDs (Solid State Drives). In the present embodiment, the SATA host control unit 111 and the SATA bridge control unit 112 are mounted as respective independent ASICs on the main controller board 101.

The panel I/F control unit 115 controls communications with the panel apparatus 116. The panel apparatus 116 functions as a UI of the MFP 100. A user operates setting screens, buttons, and so forth displayed on the panel apparatus 116 to give setting instructions relating to the MFP 100 and also checks a state of the MFP 100. The video output I/F unit 117 controls communication of commands and statuses to and from the printing unit 118. The printing unit 118 has a sheet feeding unit and a sheet discharging unit (not shown). Based on commands obtained from the video output I/F unit 117, the printing unit 118 prints images on sheets fed from the sheet feeding unit and outputs printed sheets to the sheet discharging unit. The power supply control unit 119 controls the supply of power to the units constituting the main controller board 101 according to levels of a power-saving mode. The main bus 120 includes internal buses such as PCIe (PCI Express) and ASIC.

Figure 2:
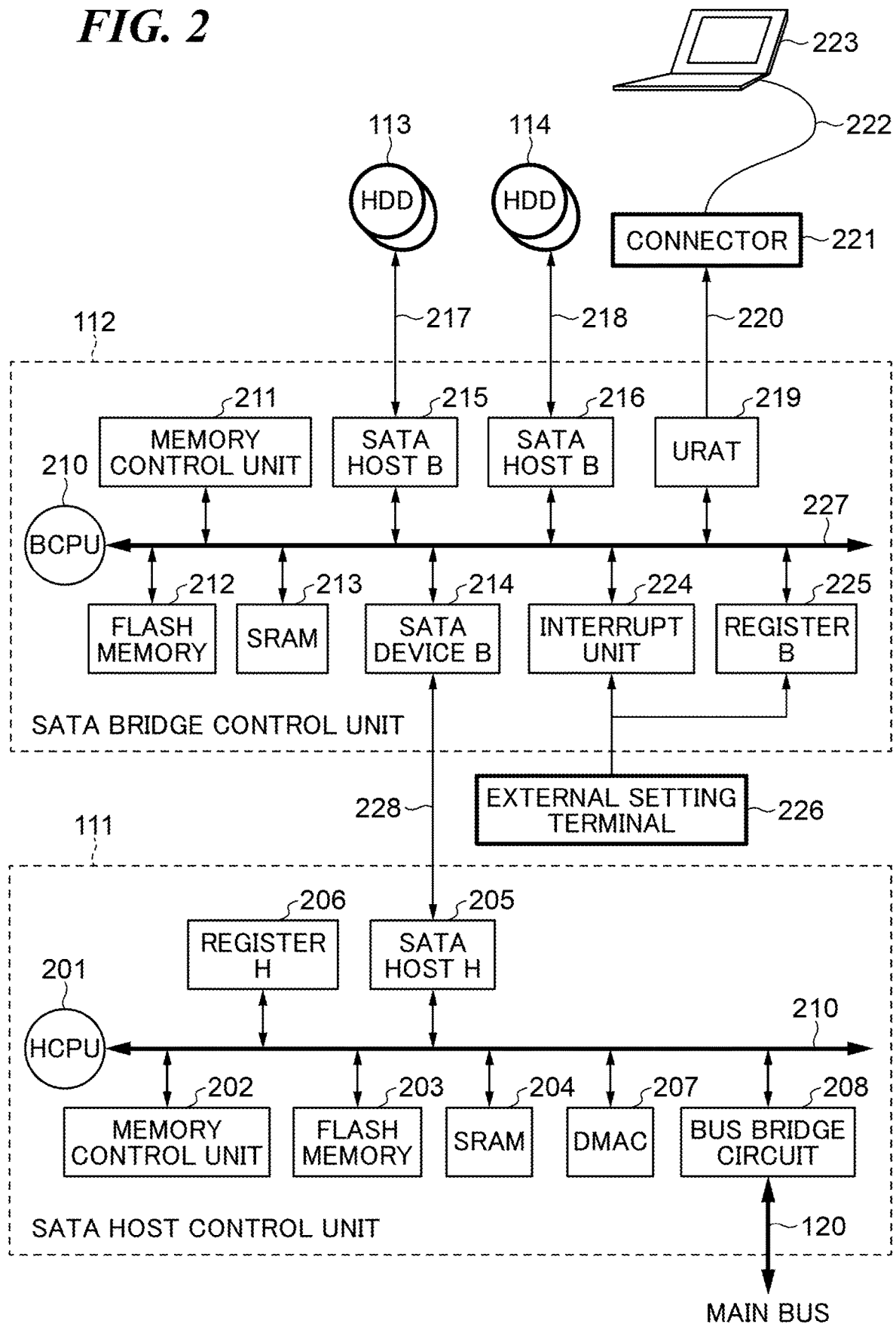
FIG. 2 is a diagram schematically showing arrangements of a SATA host control unit and a SATA bridge control unit in FIG. 1.

FIG. 2 is a diagram schematically showing arrangements of the SATA host control unit 111 and the SATA bridge control unit 112 in FIG. 1.

Referring to FIG. 2, the SATA host control unit 111 has an HCPU 201, a memory control unit 202, a flash memory 203, an SRAM 204, a SATA host H 205, a register H 206, a DMAC 207, and a bus bridge circuit 208. It should be noted that DMAC is an abbreviation of Direct Memory Access Controller. The HCPU 201, the memory control unit 202, the flash memory 203, the SRAM 204, the SATA host H 205, the register H 206, the DMAC 207, and the bus bridge circuit 208 are connected to one another via an H bus 210.

The HCPU 201 acts as a SATA host controller to perform overall control. For example, the HCPU 201 controls a SATA command issuing process, a sent and received data transferring process, and a status receiving process. The memory control unit 202 controls reading and writing of data from and into the flash memory 203 and the SRAM 204. The flash memory 203 stores a boot program and a SATA controller control program. The SRAM 204 is used as a work area for the HCPU 201, a storage area for control tables and parameters, a data buffer, and so forth. The SATA host H 205 is a SATA-IP core including a link layer and a physical layer (PHY) and carries out a host process as the SATA standard. The register H 206 is a register for temporarily storing control parameters, status parameters, and so forth. The DMAC 207 controls data transfer between predetermined memories based on beginning addresses and sizes of a transfer source and a transfer destination designated by the HCPU 201. The bus bridge circuit 208 performs bus protocol conversion between the main bus 120 and the H bus 210. The H bus 210 includes a bus controller.

Referring to FIG. 2, the SATA bridge control unit 112 has a BCPU 210, a memory control unit 211, a flash memory 212, an SRAM 213, a SATA device B 214, a SATA host B 215, a SATA host B 216, a URAT 219, an interrupt unit 224, and a register B 225. The BCPU 210, the memory control unit 211, the flash memory 212, the SRAM 213, the SATA device B 214, the SATA host B 215, the SATA host B 216, the URAT 219, the interrupt unit 224, and the register B 225 are connected to one another via a B bus 227.

The BCPU 210 acts as a SATA host and a device controller to perform overall control. For example, the BCPU 210 controls a SATA command sending and receiving process, a sent and received data transferring process, and a status sending and receiving process. The memory control unit 211 controls reading and writing of data from and into the flash memory 212 and the SRAM 213. The flash memory 212 is a non-volatile storage device. The flash memory 212 stores a boot program, and a control program as a SATA controller. The flash memory 212 is also used as an area where setting values, which are required to be held when the power to the MFP 100 is turned off, and a debug area. The SRAM 213 is used as a work area for the BCPU 210, a storage area for control tables and parameters, a data buffer, and so forth. In the SRAM 213, for example, logs which are execution results of event processing for events relating to the SATA bridge control unit 112 are recorded. The SATA device B 214 is connected to the SATA host H 205 of the SATA host control unit 111 via a SATA I/F 228. The SATA device B 214 is a SATA-IP core including a link layer and a physical layer (PHY) and performs processing as a device according to the SATA standard.

The SATA host B 215 and the SATA host B 216 perform processing as hosts according to the SATA standard. The SATA host B 215 is connected to the HDD 113 via a SATA cable 217. The SATA host B 216 is connected to the HDD 114 via a SATA cable 218. The URAT 219 is a signal conversion circuit. The URAT 219 converts a parallel signal into a serial signal and converts a serial signal into a parallel signal through start-stop transmission. The URAT 219 is connected to a PC 223 via a URAT I/F 220, a connector 221, and a serial cable 222. The URAT 219 outputs, for example, the logs written from the SRAM 213 to the flash memory 212 to the PC 223 via serial communication (hereafter referred to "the serial output"). The interrupt unit 224 has a function of providing notification about an interrupt on an event. The register B 225 is for temporarily storing control parameters, status parameters, and so forth. Part of the interrupt unit 224 and the register B 225 is connected to an external setting terminal 226. The interrupt unit 224 issues an interrupt notification according to an external terminal setting value. The register B 225 reads a status of the interrupt notification. The B bus 227 includes a bus controller.

Figure 3:
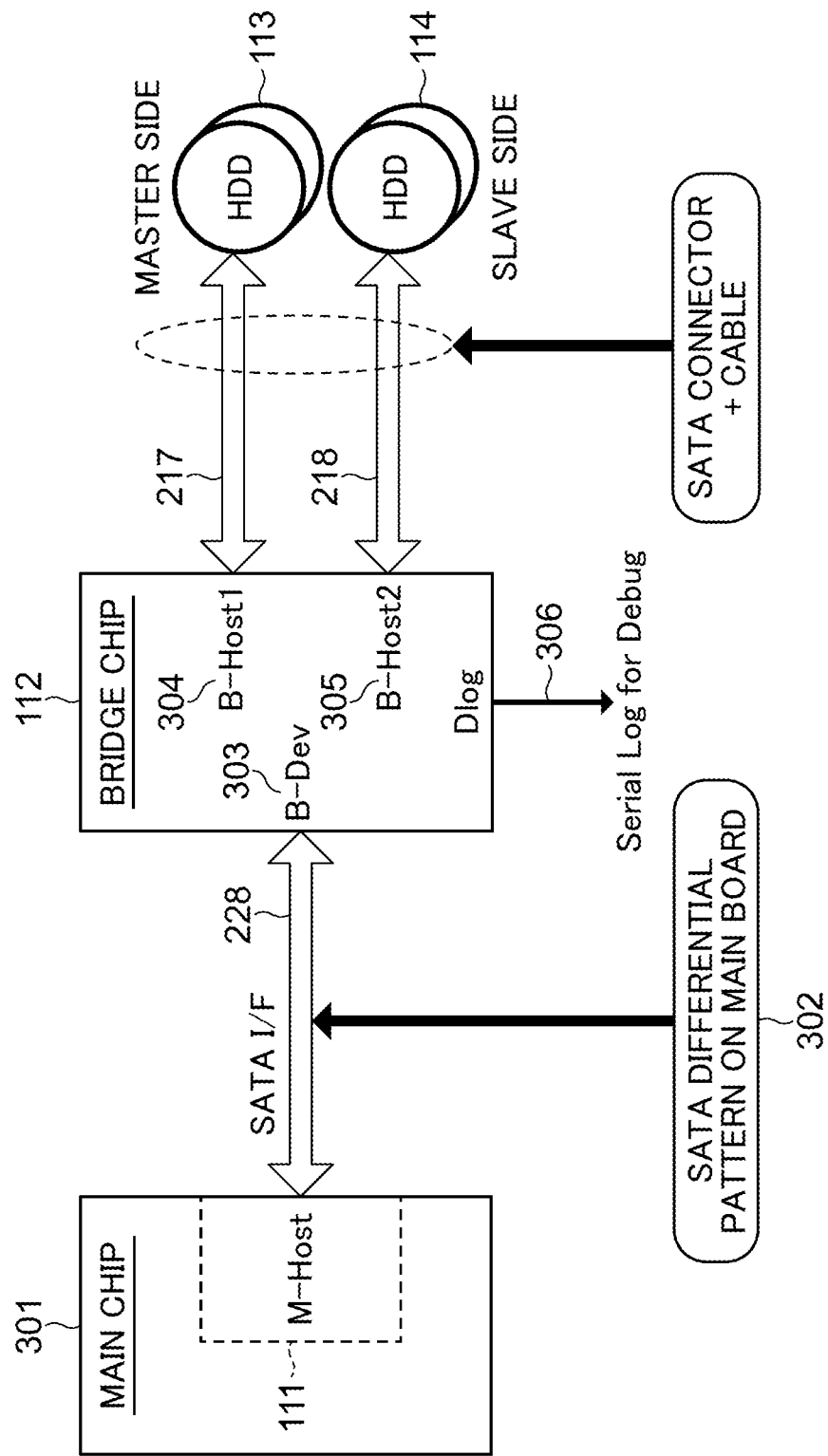
FIG. 3 is a diagram showing how the SATA host control unit and the SATA bridge control unit in FIG. 1 are connected together.

FIG. 3 is a diagram showing how the SATA host control unit 111 and the SATA bridge control unit 112 in FIG. 1 are connected together. A main chip 301 in FIG. 3 is an ASIC which is mounted on the main controller board 101 and plays a central role in control. The main chip 301 includes the memory control unit 103, the SATA host control unit 111, and so forth. In FIG. 3, a bridge chip 112 which is an ASIC form of the SATA bridge control unit 112 is designated by the same reference numeral as the SATA bridge control unit 112.

Referring to FIG. 3, the main chip 301 is connected to the bridge chip 112 via an on-board differential pattern 302. The bridge chip 112 is connected to the HDD 113, which is a master, via the SATA cable 217 and connected to the HDD 114, which is a slave, via the SATA cable 218. Here, the bridge chip 112 is a security chip having the data encrypting/decrypting function as described above. Accordingly, the bridge chip 112 is provided only with minimum I/Fs required to communicate with other chips. Specifically, the bridge chip 112 is provided only with a debugging serial output I/F 306 as well as three I/Fs 303 to 305 for communicating with the main chip 301, the HDD 113, and the HDD 114. Thus, for the bridge chip 112, security is given priority, and hence, it has no I/F or the like for connecting a debugger that emulates the BCPU 210. In the bridge chip 112, information is processed only by internal memories mounted on the bridge chip 112, specifically, the SRAM 213 and the flash memory 212, and no recording area cannot be added to the internal memory. Furthermore, as described above, the main chip 301 and the bridge chip 112 are connected on board, and it is difficult to use a SATA protocol analyzer usually connected via a cable. To analyze a failure in such a SATA-SATA bridge arrangement, a first debugging method that records all of process steps in a storage device of the MFP 100 as with the prior art, or a second debugging method using a debugger for emulating externally, which is installed in the MFP 100, cannot be adopted. For this reason, it is impossible to analyze a failure of the bridge chip 112 which has a high degree of independence and to which no recording area can be added to internal memory.

To solve this problem, a scope of what is recorded in the flash memory 212 is specified in the present embodiment.

FIGS. 4A and 4B are views useful in explaining settings on serial output of logs for use in analyzing a failure of the MFP 100 in FIG. 1. FIG. 4A shows specifications of settings on an SDL (Setup Debug Log) command for instructing the SATA bridge control unit 112 in FIG. 1 to serially output logs.

The SDL command is an extended command which is uniquely defined as a control command for the SATA bridge control unit 112 with respect to a vender unique command (empty command) defined according to the SATA standard. The SDL command includes a setting value which represents any of three mode settings written in a specification 401 in FIG. 4A, and based on this setting value, the modes of the SATA bridge control unit 112 are switched. In the present embodiment, a user selects one of the following modes as a mode setting via the panel apparatus 116, the PC 223, or the like: "Output OFF", "Mode 1", and "Mode 2". When "Output OFF" is set, the SATA bridge control unit 112 does not serially output logs. In the following, a mode corresponding to the setting of "Output OFF" is referred to as the "normal mode". When "Mode 1" is set, the SATA bridge control unit 112 serially outputs logs including details and execution results of a plurality of event processes for an event related to the SATA bridge control unit 112 to the PC 223 in real time. When "Mode 2" is set, the SATA bridge control unit 112 holds the logs mentioned above and serially outputs the held log to the PC 223 at predetermined times. When the user selects "Mode 2" from the three mode settings, the number of times that a normal log is obtained, an abnormal log obtainment starting point, and forced output, which will be described later, can be set with the panel apparatus 116 or the PC 223.

A detailed description will now be given of "Mode 2". When "Mode 2" is set, memory configurations of the SRAM 213 and the flash memory 212 in the SATA bridge control unit 112 are changed from those for a normal mode to those for the mode 2, and units of event processing that have occurred are numbered in consecutive order. Logs are recorded in the SRAM 213, and they are continuously recorded until there is no free space in a storage area in the SRAM 213 which is allocated to the mode 2 (hereafter referred to merely as "the SRAM area"). In a case where no failure occurs until data is written into the entire SRAM area, data is overwritten in the SRAM area from the beginning. Also, data in the SRAM area recorded when an event related to an error that has occurred for the first time since "Mode 2" was set, that is, from when a first error occurred to when there is no free space in the SRAM area is collectively written into the flash memory 212. At this time, how many normal logs immediately before occurrence of the error will be written into the flash memory 212 is determined based on a setting value regarding the above described number of times that normal logs are obtained. When data has been written into the whole of a storage area in the flash memory 212 which is allocated to the mode 2 (hereafter referred to merely as "the flash memory area"), the SATA bridge control unit 112 stops the process in which logs are recorded. The data recorded in the flash memory area is output from the debugging serial output I/F 306 to the PC 223.

Here, since the location at which the serially-output logs are recorded is only the flash memory 212, a sufficient amount of storage area cannot be secured, and hence there may be a case where only logs of some of event processes for events that have occurred can be recorded. In this case, it is conceivable that by using the reproducibility of a failure, the same event is caused to occur again so that logs of the rest of the event processes that could not be recorded last time can be recorded. However, as described above, the SATA bridge control unit 112 has a high degree of independence, and no recording area can be added to internal memory such as the flash memory 212. For this reason, even if the same event occurs, the SATA bridge control unit 112 cannot record logs of the rest of the event processes in the flash memory 212. To cope with this, in the present embodiment, the abnormal log obtainment starting point is set. For example, to record logs succeeding a previously-recorded log with a serial number "99", "100" is set as the abnormal log obtainment starting point is started. If the same event as the last event occurs in a state in which "100" is set as the abnormal log obtainment starting point is started, the logs from the serial number "100" onward are recorded in the flash memory 212 without the logs up to the serial number "99" being recorded in the flash memory 212. Thus, in the present embodiment, the scope of what is recorded in the flash memory 212 is specified based on a setting value of the abnormal log obtainment starting point in the SDL command.

A description will now be given of forced output in "Mode 2". When forced output is enabled (setting value: 1) in "Mode 2", the SATA bridge control unit 112 serially outputs logs recorded in the flash memory 212 to the PC 223 when sending an SDL command. It should be noted that forced output is enabled only in a case where the mode setting immediately before sending of an SDL command is "Mode 2", and otherwise, forced output is disabled.

Figure 5:
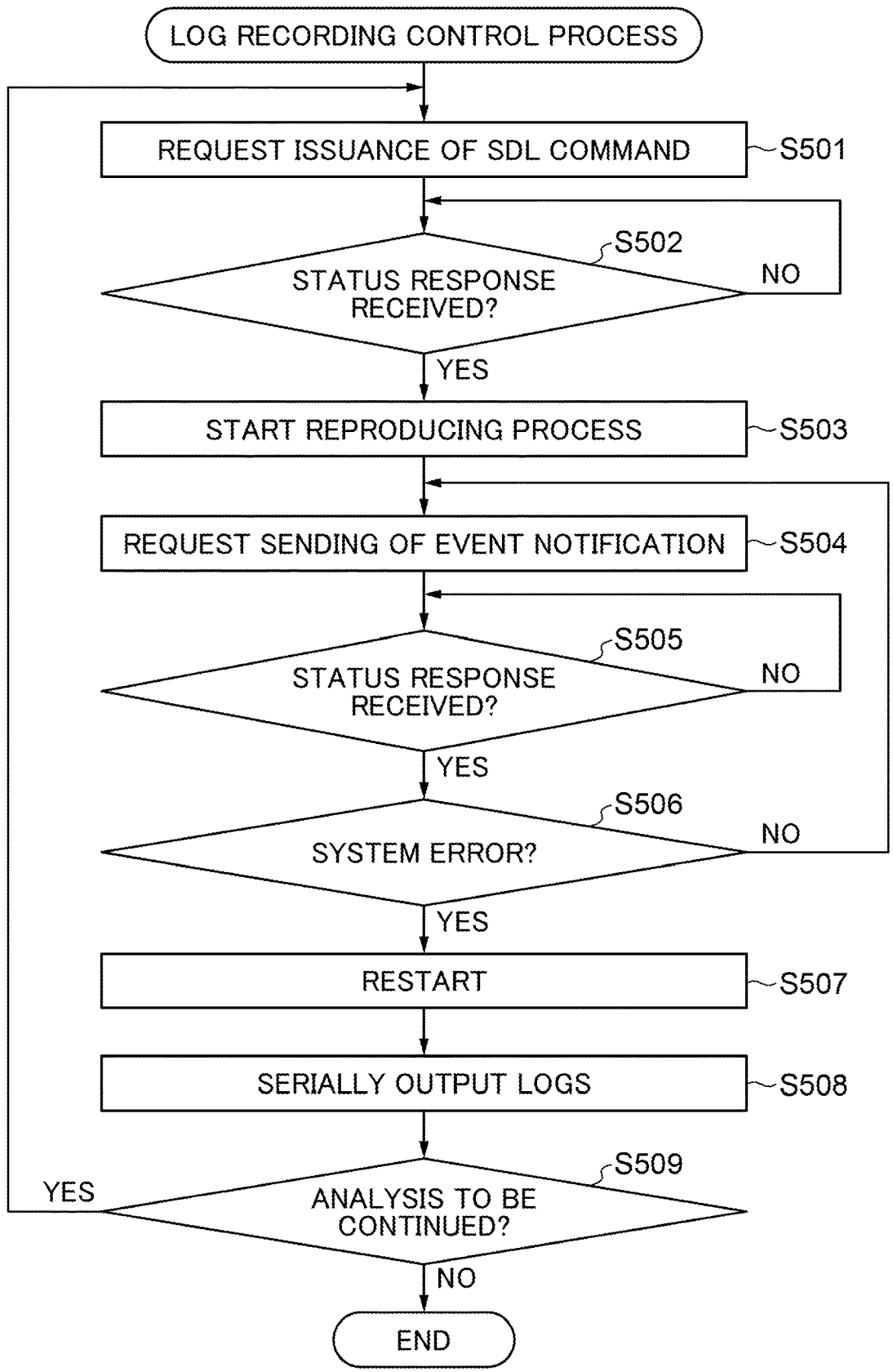
FIG. 5 is a flowchart showing the procedure of a log recording control process which is carried out by the SATA host control unit in FIG. 1.

FIG. 5 is a flowchart showing the procedure of a log recording control process which is carried out by the SATA host control unit 111 in FIG. 1. It should be noted that the SATA host control unit 111 is directly controlled by the HCPU 201, but it is assumed that the log recording control process in FIG. 5 is carried out by the main CPU 102 that integratedly controls the SATA host control unit 111. It is also assumed that requests and notifications are passed between the main CPU 102 and the HCPU 201 in interrupt processes.

Referring to FIG. 5, the main CPU 102 requests the HCPU 201 to issue an SDL command (step S501). The HCPU 201 that has received the request issues an SDL command to the BCPU 210. Next, when the HCPU 201 receives a status response to the SDL command (YES in step S502), the main CPU 102 starts a reproducing process in which it reproduces a failure occurrence situation (step S503). Then, the main CPU 102 creates a descriptor table in which consecutive Write DMA commands are described, designates a beginning address of the descriptor table, and requests the HCPU 201 to send an event notification indicating occurrence of an event (step S504). The HCPU 201 that has received this request successively sends the Write DMA commands to the BCPU 210 from the beginning of the descriptor table. After that, when the HCPU 201 receives a status response from the BCPU 210 (YES in step S505), the main CPU 210 determines whether or not a system error to be analyzed has occurred (step S506).

When the main CPU 102 determines in the step S506 that the system error has not occurred, the process returns to the step S504. The main CPU 102 repeatedly carries out the processes in the steps S504 to S506 until the system error occurs. As a result of the determination in the step S506, when the system error has occurred, the main CPU 102 restarts the MFP 100 (step S507). In the step S507, the main CPU 102 restarts the MFP 100 by carrying out a reboot process, or in response to an instruction from a person who analyzes a failure, the main CPU 102 restarts the MFP 100. After completing the restart, the main CPU 102 serially outputs logs to the PC 223 connected to the MFP 100 via the connector 221 (step S508). The person who analyzes the failure analyzes the logs, which have been serially output from the MFP 100, via the PC 223. Then, the main CPU 102 determines whether or not the analysis of the failure is to be continued (step S509). In the step S509, for example, upon receiving an instruction to finish analyzing the failure from the person who analyzes the failure, the main CPU 102 determines that the analysis of the failure is not to be continued. On the other hand, upon receiving a request to serially output a succeeding log from the person who analyzes the failure, the main CPU 102 determines that the analysis of the failure is to be continued.

As a result of the determination in the step S509, when the main CPU 102 determines that the analysis of the failure is to be continued, the process returns to the step S501, in which, for example, the main CPU 102 in turn requests the HCPU 201 to issue an SDL command in which a serial number corresponding to the succeeding log is set at the abnormal log obtainment starting point. As a result of the determination in the step S509, when the analysis of the failure is not to be continued, the main CPU 102 ends the present process.

Figure 6A:
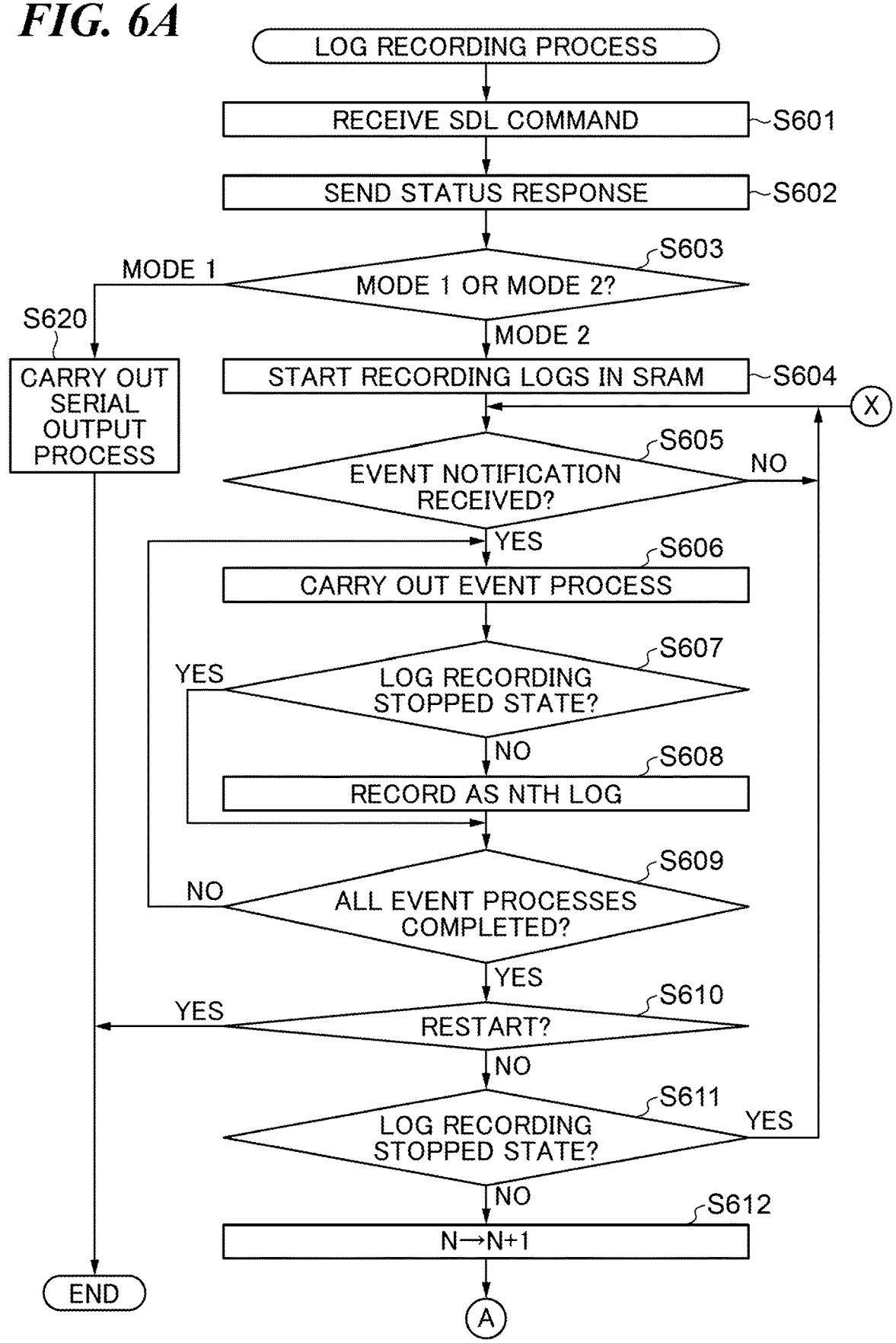
FIGS. 6A and 6B are flowcharts showing the procedure of a log recording process which is carried out by the SATA bridge control unit in FIG. 1.
Figure 6B:
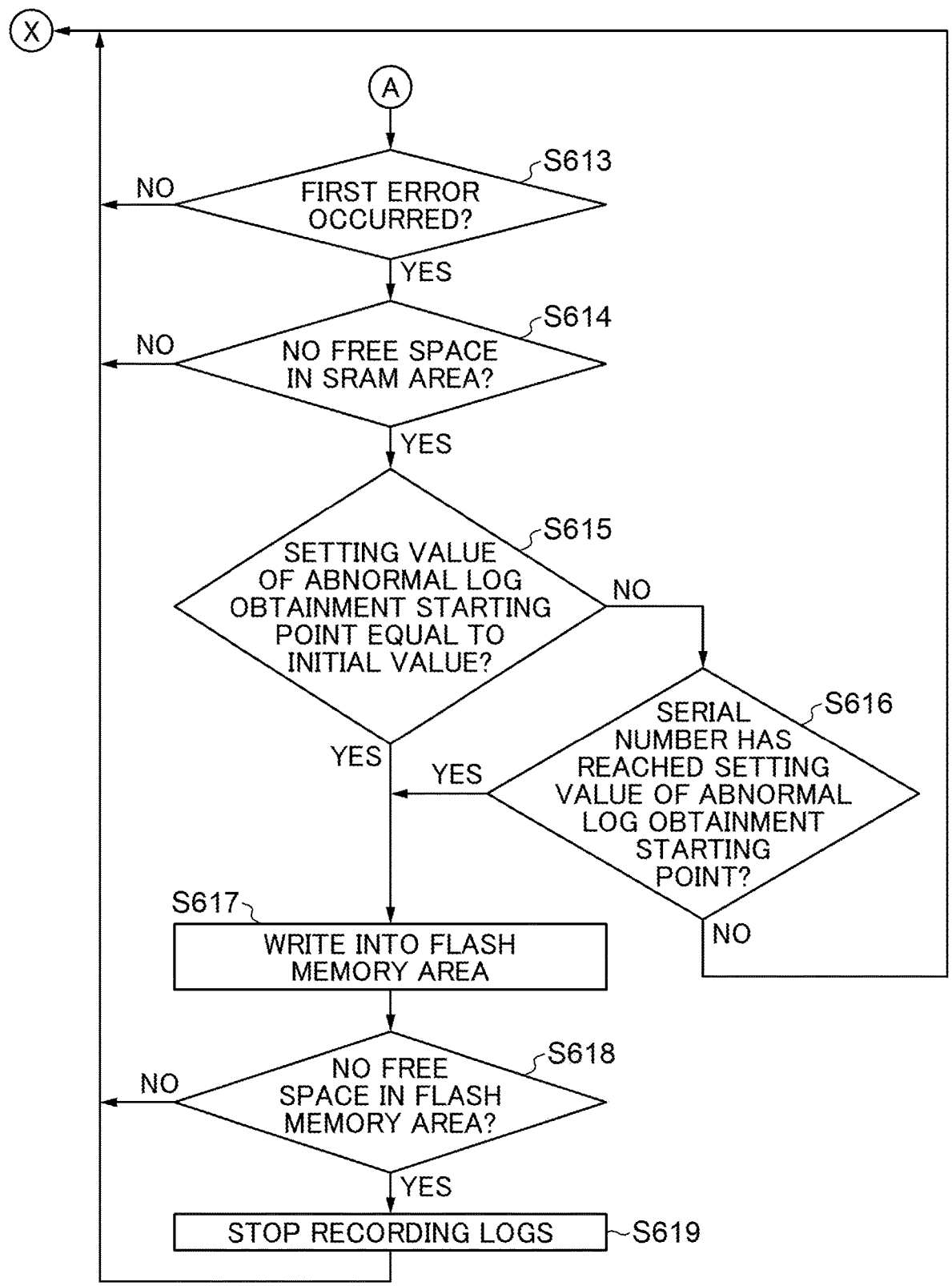

FIGS. 6A and 6B are flowcharts showing the procedure of a log recording process which is carried out by the SATA bridge control unit 112 in FIG. 1. The log recording process in FIGS. 6A and 6B are carried out by the BCPU 210 of the SATA bridge control unit 112.

Referring to FIGS. 6A and 6B, upon receiving an SDL command issued by the HCPU 201 (step S601), the BCPU 210 identifies a mode setting configured in the SDL command. When the mode setting configured in the SDL command is "Output OFF", the BCPU 210 ends the present process. On the other hand, when the mode setting configured in the SDL command is "Mode 1" or "Mode 2", the BCPU 210 makes a log recording preparation. As the log recording preparation, the BCPU 210 changes allocations of respective storage areas in the flash memory 212 and the SRAM 213 according to the mode setting configured in the received SDL command. The BCPU 210 collects, as header information, internal information on the present situation such as details of various status registers. The collected header information is serially output as a log with a serial number "0". It should be noted that data can be rewritten in the flash memory 212 only a limited number of times. In a case where the SATA bridge control unit 112 is configured to record the internal information on the present status in the flash memory 212 each time the power is turned off for power saving or the like, the flash memory 212 is provided with a plurality of, for example, 10 storage areas so as to prolong the life of the flash memory 212. The life of the flash memory 212 can be extended by using those storage areas as ring buffers. When the mode setting configured in the SDL command is "Mode 2", only one storage area in which the latest information is recorded is left, and the other 9 storage areas are allocated to log recording. Thus, in the present embodiment, when the mode setting is "Mode 2", the storage areas in the SRAM 213 and the flash memory 212 are configured to be able to record logs to the greatest extent possible.

The BCPU 210 also sends a status response to the HCPU 210 (step S602). Then, the BCPU 210 determines whether "Mode 1" or "Mode 2" is set in the SDL command (step S603).

As a result of the determination in the step S603, when "Mode 2" is set in the SDL command, the BCPU 210 starts recording logs in the SRAM 213 (step S604). In "Mode 2", since the serial number "0" is used for the header information as described above, recording of the logs is always started from a log with a serial number "1". Then, the BCPU 210 stands by until it receives an event notification. Examples of an event corresponding to the event notification is an interrupt event in the BCPU 210 and an event in which the BCPU 210 itself detects a change in register information. More specifically, the event is receipt of a command, receipt of a status, receipt of a reset, detection of an error such as timeout, detection of a power-saving request, or the like. Upon receiving the event notification (YES in step S605), the BCPU 210 performs an event process relating to the received event notification (step S606). Then, the BCPU 210 determines whether or not the SATA bridge control unit 112 is in a log recording stopped state (step S607). The log recording stopped state is a state in which no more logs can be recorded because data has been written in all of the flash memory areas in the SATA bridge control unit 112.

As a result of the determination in the step S607, when the SATA bridge control unit 112 is in the log recording stopped state, the BCPU 210 carries out a process in step S609, which will be described later. As a result of the determination in the step S607, when the SATA bridge control unit 112 is not in the log recording stopped state, the BCPU 210 records a log of the event process carried out in the step S606 as a log with a serial number N in the SRAM 213 (step S608). Then, the BCPU 210 determines whether or not all event processes have been completed (step S609).

When the BCPU 210 determines in the step S609 that any of the event processes is incomplete, the process returns to the step S606. Thus, in the present embodiment, the logs of the respective event processes with serial numbers assigned thereto are recorded in the SRAM 213. As a result of the determination in the step S609, when all the event processes have been completed, the BCPU 210 determines whether or not the event corresponding to the event notification is an event that requires restarting of the MFP 100 (step S610).

As a result of the determination in the step S610, when the event corresponding to the event notification is an event that requires restarting of the MFP 100, the BCPU 210 restarts the MFP 100 and ends the present process. As a result of the determination in the step S610, when the event corresponding to the event notification is not an event that requires restarting of the MFP 100, the BCPU 210 determines whether or not the SATA bridge control unit 112 is in the log recording stopped state (step S611).

When the BCPU 210 determines in the step S611 that the SATA bridge control unit 112 is in the log recording stopped state, the process returns to the step S605. In the log recording stopped state, an event process is carried out without any log being recorded in the flash memory 212 and the SRAM 213. As a result of the determination in the step S611, when the SATA bridge control unit 112 is not in the log recording stopped state, the BCPU 210 increments a serial number (step S612). Then, the BCPU 210 determines whether or not a first error has occurred (step S613). The first error is an error that has occurred for the first time since "Mode 2" was set.

As a result of the determination in the step S613, when the first error has not occurred, the process returns to the step S605, in which the BCPU 210 in turn records a log in the SRAM area in response to receipt of an event notification. Here, for example, when there is no free space in the SRAM area, the BCPU 210 successively overwrites the log from the beginning of the SRAM area. Namely, in the present embodiment, logs that have been recorded until the initial error occurs are not held when there is no free space in the SRAM area. As a result of the determination in the step S613, when the initial error has occurred, the BCPU 210 determines whether or not there is no free space in the SRAM area (step S614).

As a result of the determination in the step S614, when there is free space in the SRAM area, the process returns to the step S605, in which the BCPU 210 in turn records a log in the SRAM area in response to receipt of an event notification. As a result of the determination in the step S614, when there is no free space in the SRAM area, the BCPU 210 determines whether or not a setting value of the abnormal log obtainment starting point in the SDL command is an initial value, for example, "0" (step S615).

As a result of the determination in the step S615, when the setting value of the abnormal log obtainment starting point in the SDL command is not the initial value, the BCPU 210 determines whether or not a serial number of the log recorded in the SRAM area in the step S608 has reached the setting value of the abnormal log obtainment starting point (step S616).

As a result of the determination in the step S616, when the serial number of the log recorded in the SRAM area in the step S608 has not reached the setting value of the abnormal log obtainment starting point, the process returns to the step S605, in which the BCPU 210 in turn records a log in the SRAM area in response to receipt of an event notification. Here, for example, when there is no free space in the SRAM area, the BCPU 210 successively overwrites the log from the beginning of the SRAM area. Namely, in the present embodiment, in the case where a value other than the initial value is set as a setting value of the abnormal log obtainment starting point in the SDL command, logs that have been recorded in the SRAM area and whose serial numbers have not reached the setting value of the abnormal log obtainment starting point are not held when there is no free space in the SRAM area.

As a result of the determination in the step S615, when the setting value of the abnormal log obtainment starting point in the SDL command is the initial value, or as a result of the determination in the step S616, when the serial number of the log recorded in the SRAM area in the step S608 has reached the setting value of the abnormal log obtainment starting point, the BCPU 210 writes the logs recorded in the SRAM area into the flash memory area (step S617). In the step S617, the logs that are written into the flash memory area for the first time after the SDL command was received in the step S601 include normal logs in number corresponding to a setting value of the normal log obtainment count in the SDL command. Then, the BCPU 210 determines whether or not there is no free space in the flash memory area (step S618).

As a result of the determination in the step S618, when there is free space in the flash memory area, the process returns to the step S605. As a result of the determination in the step S618, when there is no free space in the flash memory area, the BCPU 210 stops recording logs into the SRAM area and the flash memory area (step S619), followed by the process returning to the step S605. After that, even if an event process is carried out, no logs are recorded in the SRAM area and the flash memory area until the MFP 100 is restarted.

As a result of the determination in the step S603, when "Mode 1" is set in the SDL command, the BCPU 210 carries out a serial output process (step S620). In the step S620, the BCPU 210 outputs header information to the PC 223 and also serially outputs logs of event processes relating to received event notifications to the PC 223 in real time. The BCPU 210 then ends the present process.

Figure 7:
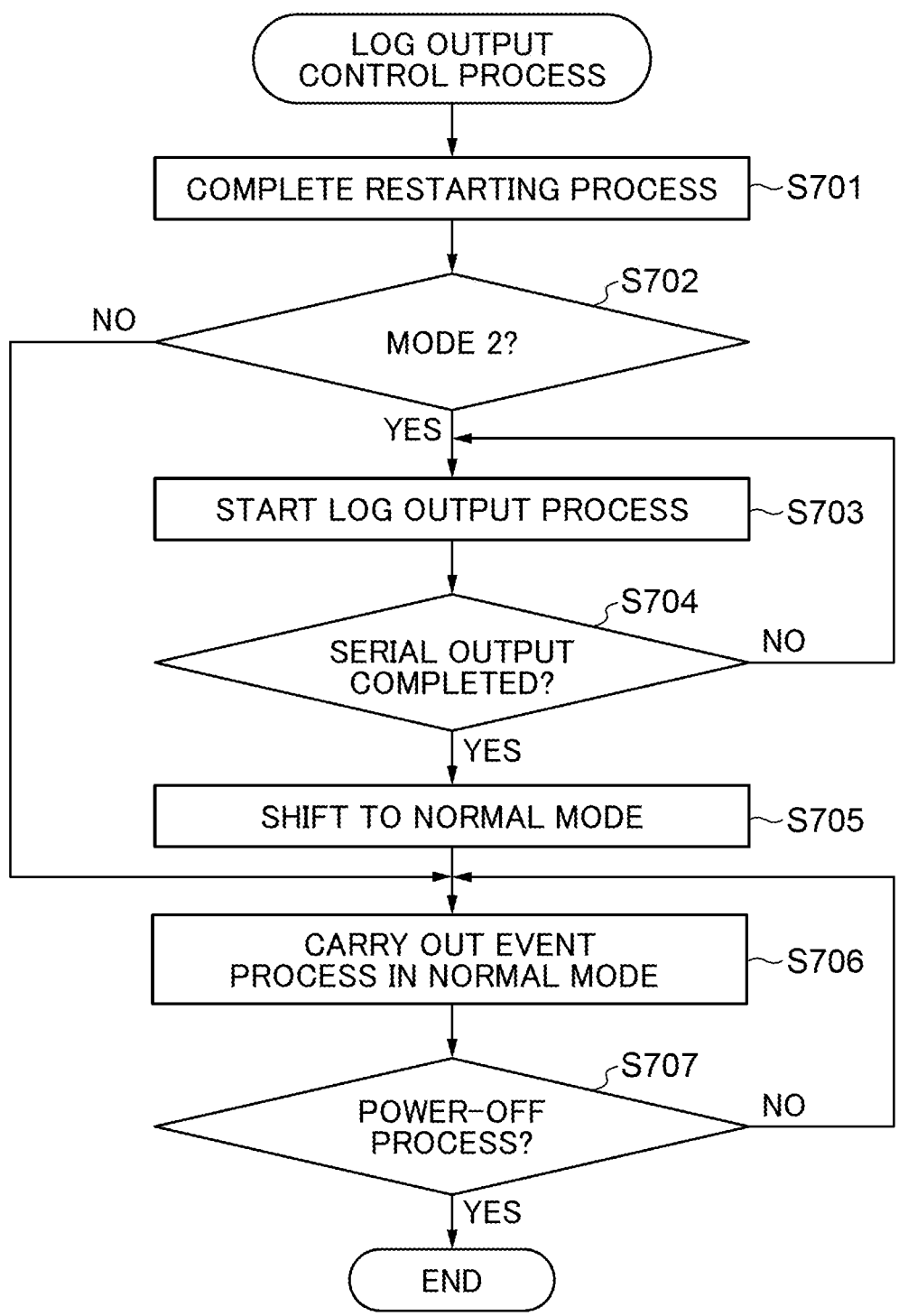
FIG. 7 is a flowchart showing the procedure of a log output control process which is carried out by the SATA bridge control unit in FIG. 1.

FIG. 7 is a flowchart showing the procedure of a log output control process which is carried out by the SATA bridge control unit 112 in FIG. 1. The process in FIG. 7 is carried out by the BCPU 210 of the SATA bridge control unit 112. The process in FIG. 7 is carried out when the MFP 100 has carried out a restarting process.

Referring to FIG. 7, when the restarting process has been completed (step S701), the BCPU 210 determines whether or not the previous mode setting, and more specifically, the mode setting immediately before the MFP 100 shifted into a power-off state is "Mode 2" (step S702).

As a result of the determination in the step S702, when the previous mode setting is not "Mode 2", the BCPU 210 carries out processes in step S706 and the subsequent steps, which will be described later. As a result of the determination in the step S702, when the previous mode setting is "Mode 2", the BCPU 210 starts a log output process (step S703). In the step S703, the BCPU 210 serially outputs logs recorded in the flash memory area to the PC 223. Then, the BCPU 210 determines whether or not serial output of all the logs to be output which are recorded in the flash memory area has been completed (step S704).

When the BCPU 210 determines in the step S704 that serial output of any of the logs to be output which are recorded in the flash memory area is incomplete, the process returns to the step S703. As a result of the determination in the step S704, when serial output of all the logs to be output which are recorded in the flash memory area has been completed, the BCPU 210 shifts the operating mode of the MFP 100 to the normal mode by switching the mode setting from "Mode 2" to "Output OFF" (step S705). When the MFP 100 has shifted to the normal mode, allocation configurations of storage areas in the SRAM 213 and the flash memory 212 are changed to those for the normal mode. Then, the BCPU 210 carries out an event process in the normal mode (step S706). After that, the BCPU 210 determines whether or not the event process carried out in the step S706 is a power-off process (step S707).

When the BCPU 210 determines in the step S707 that the event process carried out in the step S706 is not the power-off process, the process returns to the step S706. As a result of the determination in the step S707, when the event process carried out in the step S706 is the power-off process, the BCPU 210 ends the present process.

According to the embodiment described above, a scope of what is recorded in the flash memory 212 is specified. Therefore, logs can be efficiently recorded in the SATA bridge control unit 112 that has a high degree of independence and can record serially-output logs only in the flash memory 212, and hence a failure of the SATA bridge control unit 112 that has a high degree of independence and in which no recording area can be added to internal memory can be analyzed.

Moreover, in the embodiment described above, a scope of what is recorded in the flash memory 212 is specified using serial numbers associated with respective event processes. Thus, logs in the SATA bridge control unit 112 can be efficiently held for respective event processes.

In the embodiment described above, logs recorded in the flash memory 212 are serially output from the SATA bridge control unit 112 when the MFP 100 is restarted. Here, when a system error occurs in the MFP 100, it causes the MFP 100 to be locked, making it impossible for the SATA bridge control unit 112 to serially output logs recorded in the flash memory 212. In order that the SATA bridge control unit 112 can serially output logs recorded in the flash memory 212, it is preferred that the logs are serially output when the MFP 100 has been restarted to unlock the MFP 100. Moreover, from the viewpoint of making it possible for a person who analyzes a failure to easily figure out the right timing of log obtainment, it is preferred that logs are serially output from the MFP 100 immediately after the MFP 100 is restarted. Accordingly, in the present embodiment, logs recorded in the flash memory 212 are serially output from the SATA bridge control unit 112 when the MFP 100 has been restarted. As a result, logs recorded in the flash memory 212 can be reliably output from the SATA bridge control unit 112, and in addition, the right timing of log obtainment can be easily figured out.

Moreover, in the embodiment described above, logs recorded in the flash memory 212 are output from the SATA bridge control unit 112 to the PC 223 via serial communication. Thus, a failure of the SATA bridge control unit 112 that has a high degree of independence and in which no recording area can be added to internal memory can be analyzed from the PC 223.

In the embodiment described above, the SATA bridge control unit 112 conforms to a predetermined standard that defines specifications of security requirements for encryption modules. Thus, it is possible to analyze a failure of an IC that conforms to the predetermined standard like the SATA bridge control unit 112.

Moreover, in the embodiment described above, the SATA bridge control unit 111 is switched between the mode 1 in which execution results of event processes are output in real time and the mode 2 in which execution results of event processes are recorded in the flash memory 213. As a result, a failure of the SATA bridge control unit 112 can be analyzed using the method suitable for an environment.

In the embodiment described above, whether the SATA bridge control unit 112 is in the mode 1 or mode 2 is determined based on a setting value included in an SDL command received by the SATA bridge control unit 112. As a result, the mode setting on the SATA bridge control unit 112 can be easily identified from the SDL command.

It should be note that in a secure environment and a situation where there is only a small amount of memory resource in which an available storage device is only the internal memory of the bridge chip 112 as with the present embodiment, it is preferred that serially-output logs have a minimum amount of information. For example, logs may be compressed character strings comprised of abbreviated letters, numbers, and so forth. The compression of information in logs is trade-off for the ease of failure analysis, and an appropriate amount of information (the amount of characters) should be determined based on a size of a recording area of a system to be applied and the degree of influence on main processing.

It should be noted that the mode setting may be configured based on settings on four terminals 1 to 4 provided in the bridge chip 112. In the present embodiment, the terminals 1 to 4 of the bridge chip 112 are configured based on a terminal specification 402 in FIG. 4B. The terminal settings are configured at an arbitrary time during or after startup of the MFP 100. The BCPU 210 that controls the SATA bridge control unit 112 is notified of the terminal settings. In the present embodiment, in a case where a setting that serially outputs logs is made at an arbitrary time after startup of the MFP 100, the present internal status is output as header information of a log first, and after that, logs of respective event processes are serially output. It should be noted that it is assumed that specifications about types of events that serially output logs and details of processes on the events are determined in advance at when the bridge chip 112 is developed.

Figure 8A:
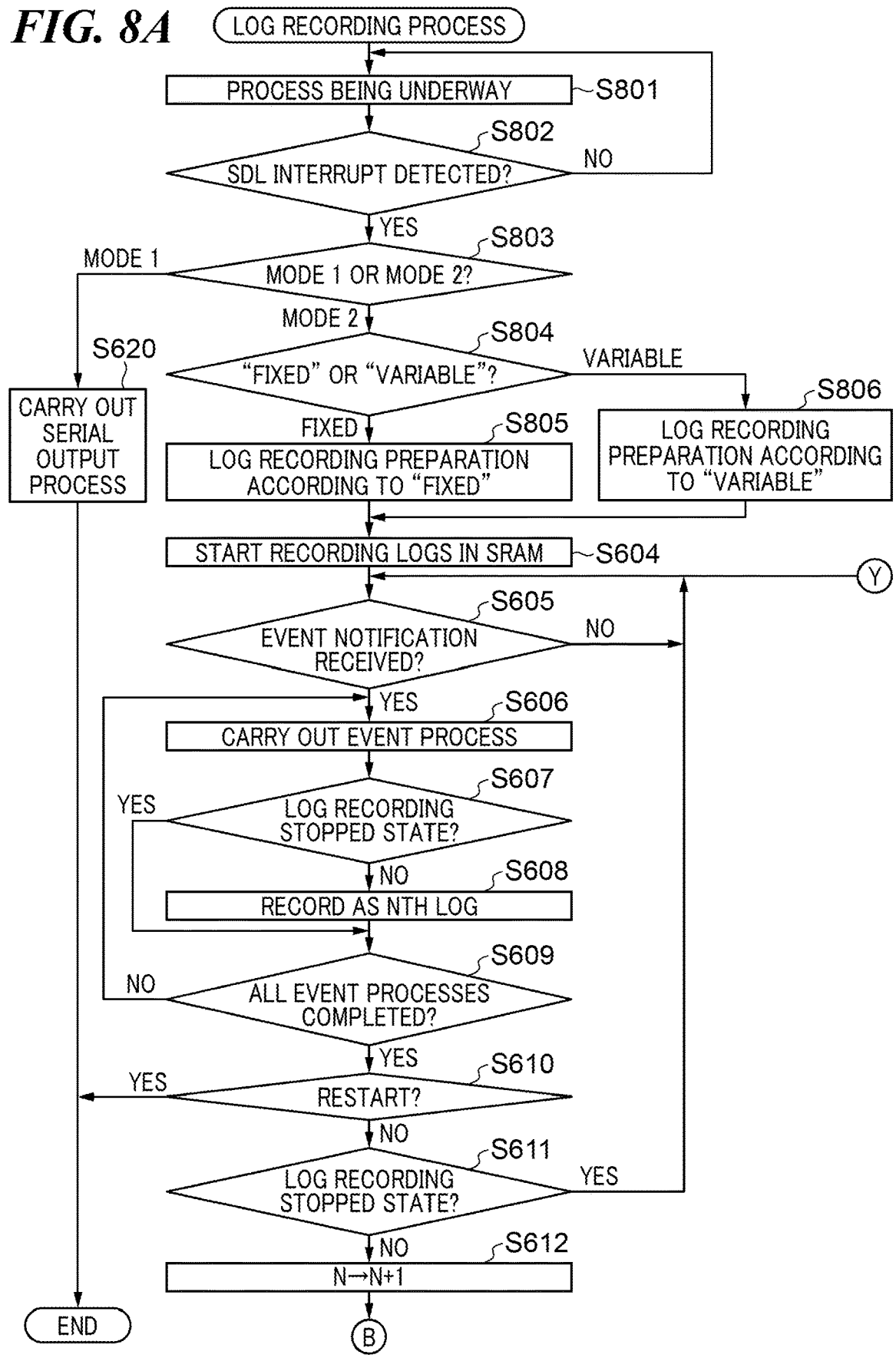
FIGS. 8A and 8B are flowcharts showing of the procedure of a variation of the log recording process in FIGS. 6A and 6B.
Figure 8B:
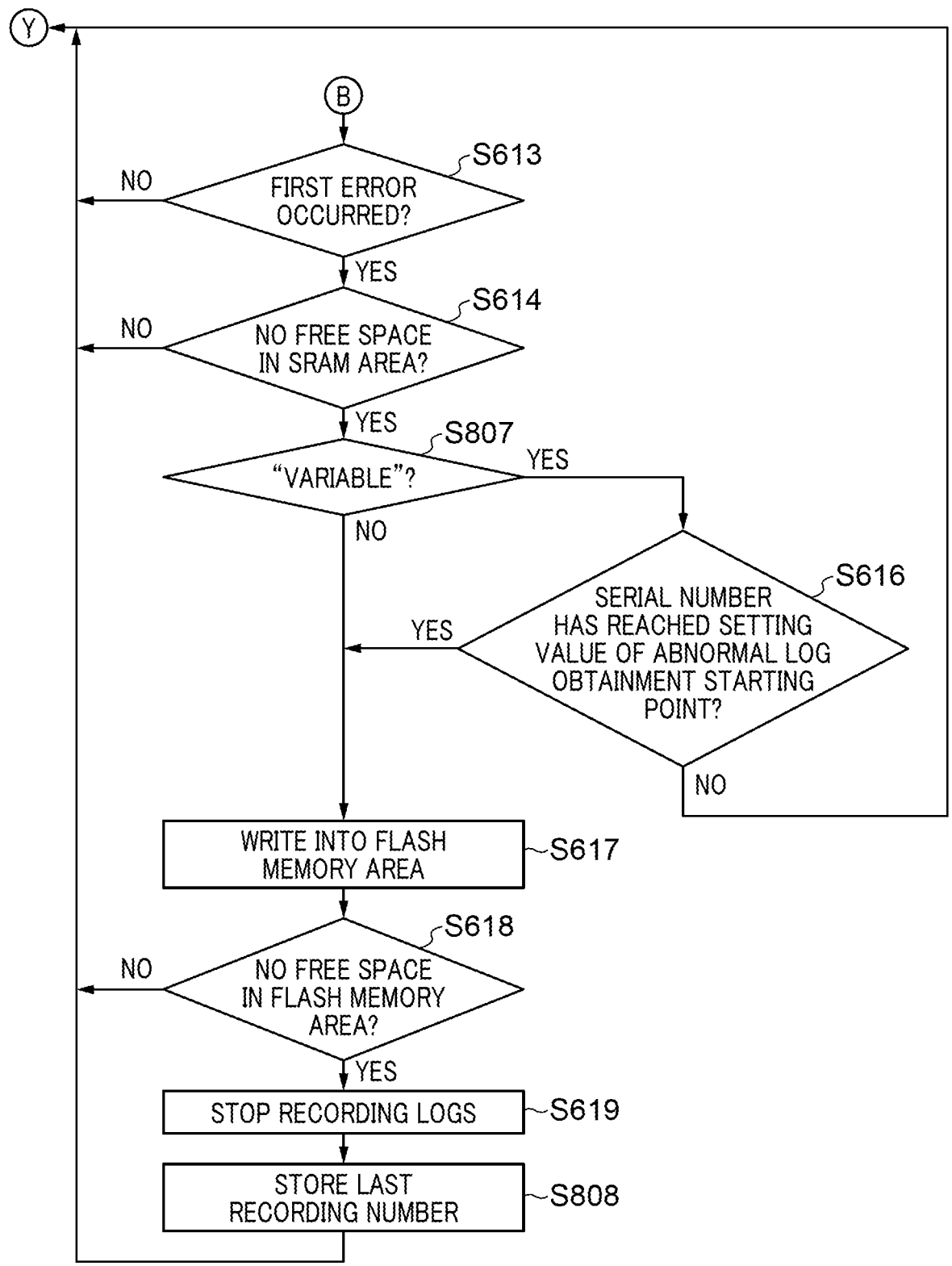

FIGS. 8A and 8B are flowcharts showing of the procedure of a variation of the log recording process in FIGS. 6A and 6B. The process in FIGS. 8A and 8B is also carried out by the BCPU 210 of the SATA bridge control unit 112. The process in FIGS. 8A and 8B is based on the assumption that a setting indicating "Mode 1" or "Mode 2" has been made for the input terminals 1 and 2 of the bridge chip 112, and a setting indicating "Fixed" or "Variable" has been made for the input terminals 3 and 4 of the bridge chip 112.

Referring to FIGS. 8A and 8B, the BCPU 210 determines whether or not an SDL interrupt was detected (step S802) when a process was underway (step S801).

When the BCPU 210 determines in the step S802 that no SDL interrupt was detected, the process returns to the step S801, in which the BCPU 210 in turn continues the ongoing processing. As a result of the determination in the step S802, when an SDL interrupt was detected, the BCPU 210 determines whether the setting on the input terminals 1 and 2 of the bridge chip 112 is "Mode 1" or "Mode 2" (step S803).

As a result of the determination in the step S803, when the setting on the input terminals 1 and 2 of the bridge chip 112 is "Mode 1", the BCPU 210 carries out the process in step S620. As a result of the determination in the step S803, when the setting on the input terminals 1 and 2 of the bridge chip 112 is "Mode 2", the BCPU 210 determines whether the setting on the input terminals 3 and 4 of the bridge chip 112 is "Fixed" or "Variable" (step S804).

As a result of the determination in the step S804, when the setting on the input terminals 3 and 4 of the bridge chip 112 is "Fixed", the BCPU 210 makes a log recording preparation according to this setting (step S805) and carries out the processes in the steps S604 to S614. As a result of the determination in the step S804, when the setting on the input terminals 3 and 4 of the bridge chip 112 is "Variable", the BCPU 210 obtains a last serial number held in step S808, which will be described later, in the log recording process carried out last time. The BCPU 210 reads a log with the last serial number from the flash memory area into the SRAM area. The BCPU 210 also makes a log recording preparation according to this setting (step S806) and carries out the processes in the steps S604 to S614.

As a result of the determination in the step S614, when there is free space in the SRAM area, the process returns to the step S605, in which the BCPU 210 in turn records a log in the SRAM area in response to receipt of an event notification. As a result of the determination in the step S614, when there is no free space in the SRAM area, the BCPU 210 determines whether or not the setting on the input terminals 3 and 4 of the bridge chip 112 is "Variable" (step S807).

As a result of the determination in the step S807, when the setting on the input terminals 3 and 4 of the bridge chip 112 is "Variable", the BCPU 210 carries out a process in the step S616. As a result of the determination in the step S807, when the setting on the input terminals 3 and 4 of the bridge chip 112 is not "Variable", the BCPU 210 carries out the process in the step S617 to S619. Then, the BCPU 210 holds the serial number of the log recorded in the step S608 as the last serial number (step S808), followed by the process returning to the step S604, in which the BCPU 210 in turn prepares for a continuation process.

In the embodiment described above, whether the SATA bridge control unit 112 is in the mode 1 or the mode 2 is determined based on the settings on the input terminals 1 to 4 provided in the SATA bridge control unit 112. As a result, the mode setting on the SATA bridge control unit 112 can be identified without generating an SDL command.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-102980, filed May 31, 2019, which is hereby incorporated by reference herein in its entirety.

What is claimed is:
1. An image forming apparatus comprising:
a main controller; and
a controller that receives instructions from the main controller, the controller comprising:
   a storage device;
   a memory storing a program; and
   at least one processor controlling the storage device and executing the program to:
      receive information indicating one of modes including a first mode in which execution results of the event processes are output in real time and a second mode in which execution results of the event processes are recorded in the storage device;
      perform control to record execution results of a plurality of event processes for events relating to the controller in the storage device; and
      perform control to output the recorded execution results in the storage device from the controller.

2. The image forming apparatus according to claim 1, wherein, when the image forming apparatus has been restarted, the controller outputs the recorded execution results in the storage device.

3. The image forming apparatus according to claim 1, wherein the controller outputs the recorded execution results in the storage device to an external apparatus via serial communication.

4. The image forming apparatus according to claim 1, wherein the controller conforms to predetermined standards that define specifications of security requirements relating to encryption modules.

5. The image forming apparatus according to claim 1, wherein the at least one processor further executes the program to determine whether the controller is in the first mode or the second mode based on a setting value included in a predetermined command received by the controller.

6. The image forming apparatus according to claim 1, wherein the at least one processor further executes the program to determine whether the controller is in the first mode or the second mode based on a setting on an input terminal provided in the controller.

7. The image forming apparatus according to claim 1, wherein the at least one processor further executes the program to specify a scope of the recorded execution results in the storage device.

8. The image forming apparatus according to claim 7, wherein serial numbers are assigned to the respective event processes, and the recorded execution result in the storage device is specified using the serial numbers associated with the respective event processes.

9. A control method for an image forming apparatus that has a main controller and a controller that receives instructions from the main controller, the controller having a storage device, a memory storing a program, and at least one processor controlling the storage device and executing the program to:
receive information indicating one of modes including a first mode in which execution results of the event processes are output in real time and a second mode in which execution results of the event processes are recorded in the storage device;
perform control to record execution results of a plurality of event processes for events relating to the controller in the storage device; and
perform control to output the recorded execution results in the storage device from the controller.

10. A non-transitory computer-readable storage medium storing a program for causing a computer to execute a control method for an image forming apparatus that has a main controller and a controller that receives instructions from the main controller, the controller having a storage device, a memory storing a program, and at least one processor controlling the storage device and executing the program to:
receive information indicating one of modes including a first mode in which execution results of the event processes are output in real time and a second mode in which execution results of the event processes are recorded in the storage device;
perform control to record execution results of a plurality of event processes for events relating to the controller in the storage device; and
perform control to output the recorded execution results in the storage device from the controller.

* * * * *